United States Patent
Joho et al.

(10) Patent No.: US 8,049,377 B2
(45) Date of Patent: Nov. 1, 2011

(54) MULTI PHASE GENERATOR WITH FREQUENCY ADAPTATION UNIT

(75) Inventors: Reinhard Joho, Rombach (CH); Andre Arndt, Lupfig (CH)

(73) Assignee: Alstom Technology Ltd, Baden (CH)

( * ) Notice: Subject to any disclaimer, the term of this patent is extended or adjusted under 35 U.S.C. 154(b) by 203 days.

(21) Appl. No.: 12/481,731

(22) Filed: Jun. 10, 2009

(65) Prior Publication Data
US 2009/0309433 A1  Dec. 17, 2009

(30) Foreign Application Priority Data
Jun. 13, 2008 (EP) .................................. 08158262

(51) Int. Cl.
*H02K 9/00* (2006.01)
(52) U.S. Cl. .......................................... 310/54; 310/270
(58) Field of Classification Search .................... 310/52, 310/54–55, 68 R, 68 D, 89, 270
See application file for complete search history.

(56) References Cited

U.S. PATENT DOCUMENTS

| | | | |
|---|---|---|---|
| 3,510,700 | A | 5/1970 | Grinchenko et al. |
| 4,488,072 | A | 12/1984 | Archibald et al. |
| 4,629,917 | A | 12/1986 | Brem |
| 4,866,316 | A | 9/1989 | Humphries et al. |
| 5,717,267 | A | 2/1998 | Paroz |
| 6,097,116 | A * | 8/2000 | Hess et al. ...................... 310/61 |
| 6,392,371 | B1 * | 5/2002 | Cheng et al. ................... 318/158 |
| 6,577,038 | B2 | 6/2003 | Butman et al. |
| 7,088,020 | B2 | 8/2006 | Holly, III et al. |
| 7,245,031 | B2 | 7/2007 | Drubel et al. |
| 7,400,072 | B2 | 7/2008 | Ward |
| 7,633,195 | B2 * | 12/2009 | Drubel et al. .................... 310/58 |
| 7,843,094 | B2 * | 11/2010 | Goodzeit et al. ................ 310/52 |
| 7,880,350 | B2 * | 2/2011 | Arndt et al. ..................... 310/71 |
| 2004/0160134 | A1 * | 8/2004 | Blatter et al. ................... 310/52 |

FOREIGN PATENT DOCUMENTS

| | | |
|---|---|---|
| DE | 1044247 | 11/1958 |
| DE | 1210942 | 2/1966 |
| DE | 1299074 | 7/1969 |
| DE | 102004016456 | 11/2005 |
| EP | 0707372 | 4/1996 |
| GB | 754175 | 8/1956 |

OTHER PUBLICATIONS

European Search Report for EP 08 15 82 61, dated Nov. 24, 2008.
European Search Report for EP 08 15 82 62, dated Nov. 14, 2008.

* cited by examiner

*Primary Examiner* — Tran Nguyen
(74) *Attorney, Agent, or Firm* — Leydig, Voit & Mayer, Ltd.

(57) ABSTRACT

A hydrogen cooled generator having an axis and a plurality of phases comprises a main casing section enclosing a stator with windings; a casing end section; at least one end winding disposed in the casing end section; a toroidal duct formed on at least one of the casing end section and the main casing section having a bottom wall and two side walls, wherein at least one of the bottom wall and the two side walls shares a wall of the casing end section so as to form a common wall; and at least one bushing penetrating the common wall and inclined towards the axis of the generator, the at least one bushing having a first end connected to the at least one end winding and a second end terminating in the toroidal duct.

11 Claims, 3 Drawing Sheets

MULTI PHASE GENERATOR WITH FREQUENCY ADAPTATION UNIT

Priority is claimed to European Application No. EP 08158262.9, filed on Jun. 13, 2008, the entire disclosure of which is incorporated by reference herein.

The invention relates to electrical generators. More particularly the invention relates to hydrogen-cooled generators with three or more phases connected to a frequency adaptation unit of the static frequency converter type that is based on high-power semiconductors.

BACKGROUND

In a common generator arrangement current is conveyed from winding ends to phase rings contained in a gas-cooled casing and then further connected to bushings used to convey the current through the casing wall. To convert the frequency of the generators multiple phases to grid frequency the bushings are further connected to semiconductor arrangements forming a separate frequency adaptation unit.

It is desirable to minimise the overall axial length of the generator and so the bushings are arranged so as to extend radially outward through the casing. The result is however a radially space inefficient design that requires complex bus ducts extending yet further outwards from the casing before being routed to a common point for connection to the frequency adaptation unit.

A partial solution to this problem, described in EP0707372, involves locating at least a part the frequency adaptation unit within the end casing so as to significantly decrease the number of required bushings thereby providing a more radially space efficient design. The arrangement is however disadvantaged in that the available space in the casing is limited and so access is poor making it difficult to check and replace components. When the generator is hydrogen cooled, further access limitations are imposed exacerbating this disadvantage. While the frequency adaptation parts in the casing can be cooled in conjunction with other generator components, in the case of hydrogen-cooled generators it is desirable to separately cool these parts, with for example deionized water, due to the amount of heat generated by the parts. However to do this inside a hydrogen-filled casing adds complexity and cost. Yet further, should the parts of the frequency adaptation unit fail e.g. by short-circuiting, they may explode. If this should occur inside the casing significant machine damage can occur.

SUMMARY OF THE INVENTION

An aspect of the present invention is to provide a space efficient layout for a hydrogen-cooled generator with a frequency adaptation unit that addresses at least some of the disadvantages known in the art.

One aspect of the invention is to incline the bushings towards the generator axis so that they terminate in a toroidal duct formed on the generator casing in which rectifier portions of a frequency adaptation unit are provided.

In one aspect the invention provides a hydrogen-cooled generator with three or more phases. The generator, comprising a casing main section enclosing a stator and a casing end section for containing the winding ends, is characterized by:

a toroidal duct, formed on either the end casing and/or main casing, having bottom and side walls wherein at least one of the walls is common with the casing end section;

bushings, penetrating one of the common walls, inclined towards the generator axis and having a first end connected to the winding ends and a second end terminating in the duct; and rectifier portions of a frequency adaptation unit, located in the duct, having an input end connected to the second end of each bushing a positive and a negative polarity collection ring each connected to output ends of each of the rectifier portions, wherein the rectifier portions of the frequency adaptation unit form a rectifier bridge arrangement between the plurality of generator phases and the collection rings. This arrangement has the advantage of providing good access to the complete frequency adaptation unit while still having the attribute of radial space efficiency, as the arrangement does not require lengthy multi-phase cabling between bushings characteristically required by installations having completely external frequency adaptation units.

In an embodiment of the invention the bushings incline towards the main casing section thereby reducing the overall length of the generator while still being radially compact. The length is yet further optimised in an aspect that provides a duct bottom wall common with the main casing.

In a further embodiment the rectifier portions located in the duct are water-cooled. This efficient means of cooling is made possible by the location of the portions units outside of the end casing.

Another aspect of the invention provides a covered duct with one or more openings through which cooling air is forced so as to provide air-cooling for the collection rings in an environment that does not have the same design demands of a hydrogen filled environment.

Further aspects of the invention provide various arrangements within the duct that are characterised by their space efficiency. These include where: bushing second ends are arranged in two or more circumferentially different rows; collection rings are arranged in more than one layer; and collection rings are arranged in one or more parallel stacks.

A further aspect of the invention is to overcome or at least ameliorate the disadvantages and shortcomings of the prior art or provide a useful alternative.

Other objectives and advantages of the present invention will become apparent from the following description, taken in connection with the accompanying drawings wherein by way of illustration and example, an embodiment of the invention is disclosed.

BRIEF DESCRIPTION OF THE DRAWINGS

By way of example, an embodiment of the invention is described more fully hereinafter with reference to the accompanying drawings, in which.

DETAILED DESCRIPTION

Figure 1:
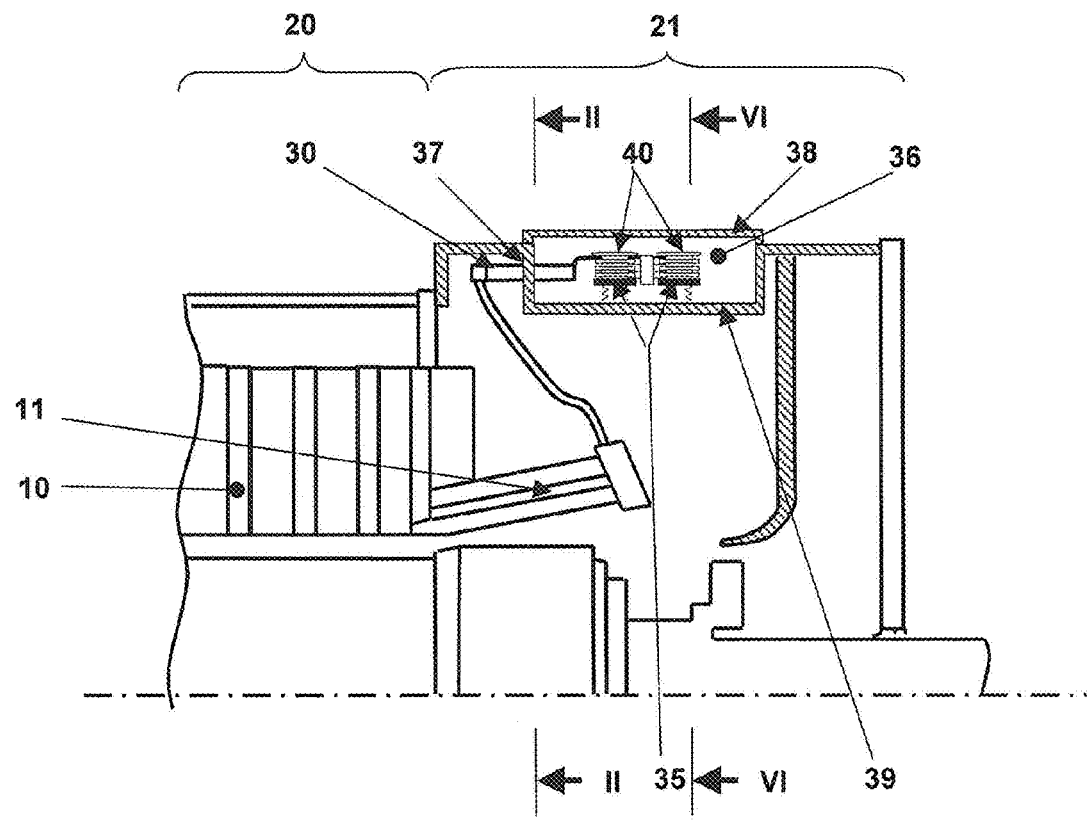
FIG. 1 is a side sectional view of an end of a hydrogen-cooled generator showing an embodiment of the invention.
Figure 2:
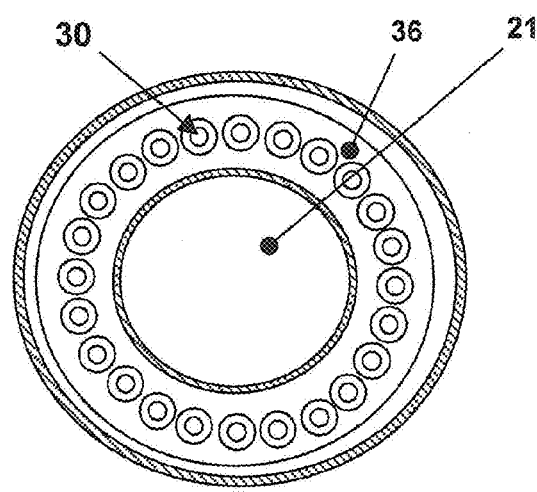
FIG. 2 is an end sectional view through section II-II of FIG. 1.

Preferred embodiments of the present invention are now described with reference to the drawings, wherein like reference numerals are used to refer to like elements throughout. In the following description, for purposes of explanation, numerous specific details are set forth in order to provide a thorough understanding of the invention. It may be evident, however, that the invention may be practiced without these specific details.

FIG. 1 shows a preferred embodiment of the invention applied to a hydrogen-cooled generator having winding ends 11 enclosed inside an end section 21 of a casing 20,21. Bushings 30, penetrating the casing 20 21, provide the means of current conduction from the winding ends through the casing 20,21 walls. The penetration, through a wall section 37,39 shared between the casing and a toroidal duct 36 formed on the casing end section 21 so as to define a common wall section, is such that the bushing ends terminate in the duct 36. This is achieve in a radially space efficient manner by the inclination of the bushings 30 so as to be parallel to the longitudinal axis of the generator, as seen in FIG. 1. The inclination may be any significant angle off vertical, i.e. angled away from the radial direction, preferably greater than 30° and most preferably great than 45° including 90°, where the optimum angle is a balance between reducing the radial dimension while considering the affect on the longitudinal dimension of the machine.

In another embodiment the same radial space efficiency inclination is maintained while the end of the bushings instead of being inclined towards the end of the casing 21, as shown on FIG. 1, are inclined towards the casing main section 20.

The toroidal duct 36, forming a part of the casing 20,21, preferably holds, contains and protects as well as provides a means of cooling collection rings 35, for conducting of current from the duct to for example a terminal board and rectifier portions of a frequency adaptation unit 40 connected to the ends of each of the bushings 30 and the collection rings 35. Preferably it is covered with at least one open end 51 at which a cooling duct fan 50 is located so by providing one means of blowing cooling air through the opening 51 into the duct 36. The location of the duct 36 "on" the casing 20,21 includes arrangements where the duct 36 is in a cavity formed in the casing 20, 21 as shown in FIG. 1, such that at least a bottom 39 and/or a sidewall 37 is common with the casing 20,21.

In another embodiment the duct 36 is at least partially located on the casing main section 20 so as to share at least part of its bottom wall 39 with this casing section 20. Other arrangements that share at least one wall with the end casing so as to enable penetration of bushings 30 could also be conceived.

Figure 3:
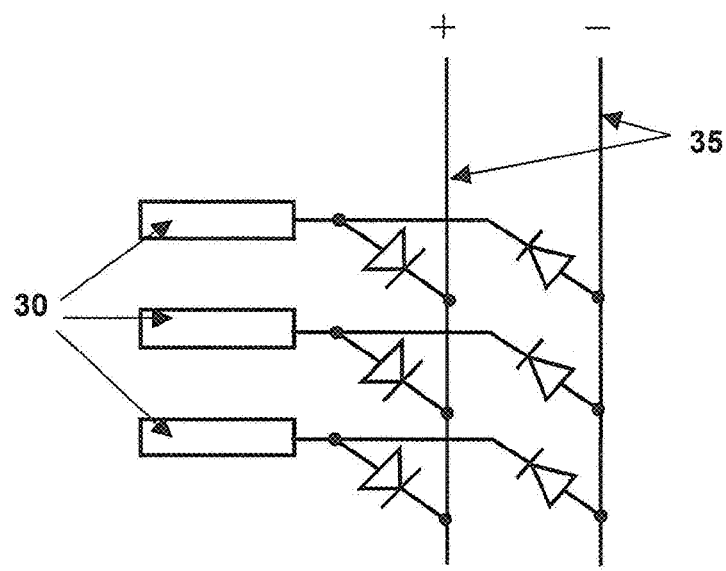
FIGS. 3 to 5 are various frequency adaptation unit circuit configurations of the invention.
Figure 4:
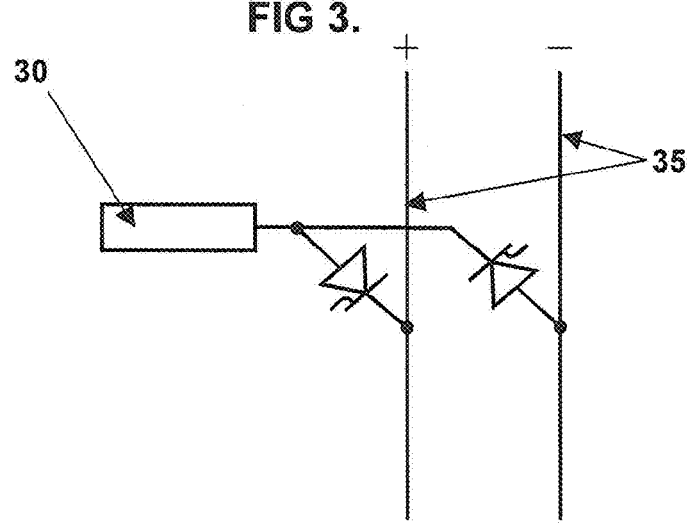
Figure 5:
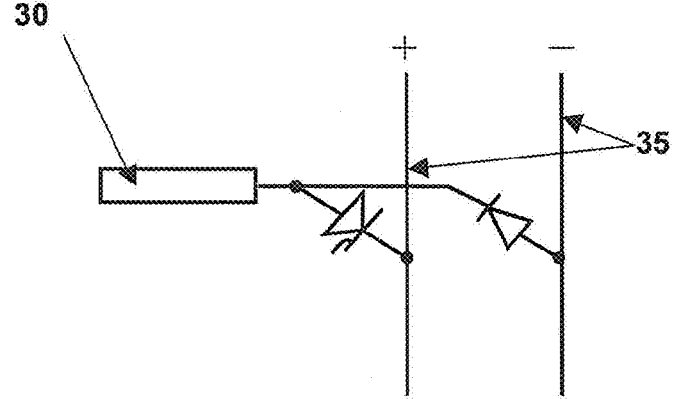

The rectifier portion of the frequency adaptation unit 40 comprises any plurality of suitable semiconductor arrangements connected at an input end to the terminating end of each bushing and at an output end to positive and negative polarity collection rings 35 which are mounted in the duct on insulation spacers 34. In this way the rectifier units 40 provide a rectifying bridge between the multiple phases of the generator and the pair of collection rings 35. Examples of some suitable arrangements are shown in FIGS. 3-5 wherein: FIG. 3 shows an embodiment that provides simple rectification without control by comprising a diode connected to a positive collection ring 35 while another diode is connected to a negative collection ring 35; FIG. 4 shows a embodiment with pure thyristors instead of diodes thereby enabling fast switch-off in case of severe disturbances; and FIG. 5 shows a polar thyristor-diode arrangement that while not providing the shutoff performance of the embodiment shown in FIG. 4 is a cheaper alternative. Instead of thyristors other suitable semiconductors elements, such as gate turn-off thyristors or insulated gate bipolar transistors, could be used. Any such suitable semiconductor arrangement may further or alternatively be composed of series connected semiconductors, by for example stacking as represented in FIG. 6, so as to provide series redundancy.

Figure 6:
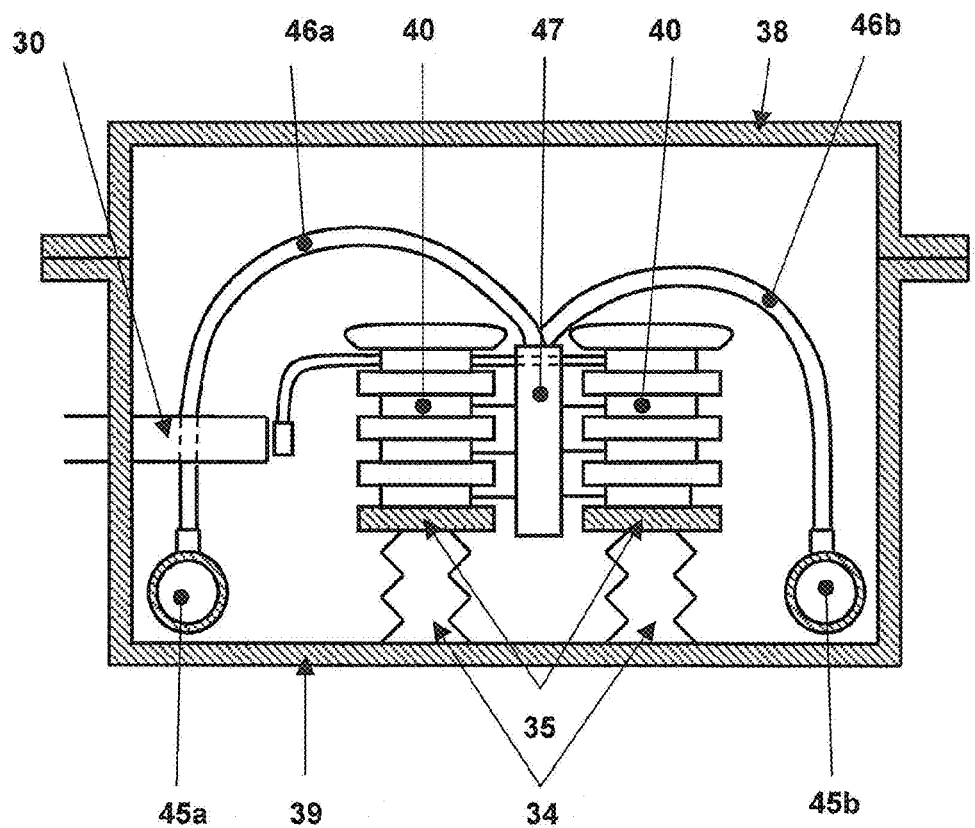
FIG. 6 is an enlarged sectional view of the duct through section VI-VI of FIG. 1.
Figure 7:
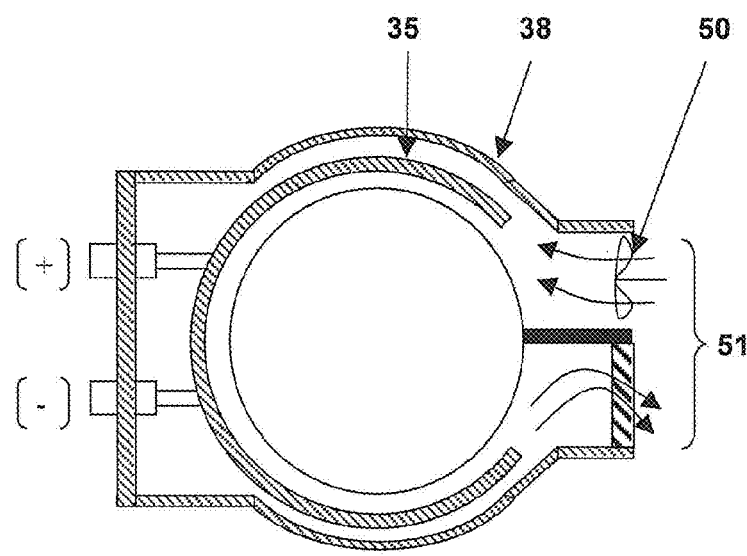
FIG. 7 is a sectional view of the duct of FIG. 1 showing air-cooling of the duct

The duct preferably is predominately closed except for an opening 51 in which air is forced through by for example a fan 50, so as to provide cooling air for the rectifying portions 40 and collecting rings 35 as shown in FIG. 6. To further supplement the cooling of the rectifying portions 40 preferably a cooling water system, as shown in FIG. 6, is provided comprising cooling water pipes 45, preferably comprises a supply 45a and return pipe 45b running through the duct 35. The cooling arrangement, in an embodiment, has supply tubes 46a, connected to the supply cooling water line 45a, for directing cooling water to manifolds 47 connected to each rectifier portion 40. From the manifolds 47 cooling water is directed past elements of the rectifying portions 40 so as to cool the portions and then returned, via the manifold 47 and a return tube 46b, to the cooling water return line 45b. The cooling water system may also be suitably configured to additionally cool the walls and if present shields in the duct 37 by for example design and location of the cooling water lines 45.

To enable the duct 36 to be more compactly designed the walls of the duct 37, 38, 39 are preferably made of non-magnetic steel and/or have an additional electrical conductive shielding of aluminium or copper applied to the inside walls of the duct 36. This reduces the electric eddy current losses in the walls 37, 38, 39.

Although the invention has been herein shown and described in what is conceived to be the most practical and preferred embodiment, it is recognized that departures can be made within the scope of the invention, which is not to be limited to details described herein but is to be accorded the full scope of the appended claims so as to embrace any and all equivalent devices and apparatus.

REFERENCE NUMBERS

10. Stator Core
11. Winding ends
20. Casing main section
21. Casing end section
30. Bushing
34. Collection ring insulation spacers
35. Collection rings
36. Collection ring duct
37. Collection ring duct sidewall
38. Collection ring duct top wall
39. Collection ring duct bottom wall
40. Rectifier portion of a frequency adaptation unit
45. Cooling water pipes
45a. Cooling water supply pipe
45b. Cooling water return pipe
46. Cooling water tubes
46a. Cooling water supply tube
46b. Cooling water return tube
47. Cooling water manifold
50. Duct cooling fan
51. Duct opening

What is claimed is:

1. A hydrogen cooled generator having an axis and a plurality of phases, the plurality of phases including more than three phases, the generator comprising:
a main casing section enclosing a stator with windings;
a casing end section;

at least one end winding of the stator windings disposed in the casing end section;

a toroidal duct having a bottom wall and two side walls, wherein at least one of the bottom wall and the two side walls shares a wall of the casing end section so as to form a common wall;

at least one bushing penetrating the common wall and inclined towards the axis of the generator, the at least one bushing having a first end connected to the at least one end winding and a second end terminating in the toroidal duct;

a frequency adaptation unit disposed in the toroidal duct, including at least one rectifier portion having an input end connected to the second end of a respective one of the at least one bushing; and a positive polarity collection ring and a negative polarity collection ring, each ring being connected to an output end of a respective one of the at least one rectifier portion, wherein the at least one rectifier portion forms a rectifying bridge between the plurality of phases and the positive and the negative polarity collection rings, further comprising a cooling water system configured to water-cool the at least one rectifier portion within the toroidal duct.

2. The generator as recited in claim 1, wherein the at least one bushing inclines towards the casing main section.

3. The generator as recited in claim 1, wherein at least a part of the bottom wall shares a wall with the main casing section.

4. The generator as recited in claim 1, wherein the at least one rectifier portion includes a series of connected semiconductors.

5. A hydrogen cooled generator having an axis and a plurality of phases, the plurality of phases including more than three phases, the generator comprising:

a main casing section enclosing a stator with windings;

a casing end section;

at least one end winding of the stator windings disposed in the casing end section;

a toroidal duct having a bottom wall and two side walls, wherein at least one of the bottom wall and the two side walls shares a wall of the casing end section so as to form a common wall;

at least one bushing penetrating, the common wall and inclined towards the axis of the generator, the at least one bushing having, a first end connected to the at least one end winding, and a second end terminating, in the toroidal duct;

a frequency adaptation unit disposed in the toroidal duct including at least one rectifier portion having an input end connected to the second end of a respective one of the at least one bushing;

a positive polarity collection ring and a negative polarity collection ring, each ring being connected to an output end of a respective one of the at least one rectifier portion, wherein the at least one rectifier portion forms a rectifying bridge between the plurality of phases and the positive and the negative polarity collection rings; and a cover covering the toroidal duct and having at least one opening through which cooling air is configured to flow into the toroidal duct so as to provide air cooling within the toroidal duct.

6. The generator recited in claim 5, wherein a majority of the toroidal duct is closed, and wherein the at least one opening in the cover includes a single opening configured to pass forced cooling air into the toroidal duct.

7. The generator recited in claim 6, wherein the forced cooling air is generated by a fan.

8. The generator recited in claim 6, further comprising a fan configured to force cooling air through the single opening in the cover into the toroidal duct.

9. The generator recited in claim 1, wherein the cooling water system includes a supply pipe and a return pipe disposed in the toroidal duct.

10. The generator recited in claim 9, wherein the cooling water system includes a manifold connected to each of the at least one rectifier portion, the supply pipe and the return pipe.

11. The generator recited in claim 9, wherein the cooling water system is configured to cool at least one of the walls of the toroidal duct.

* * * * *